United States Patent [19]
Tang

[11] Patent Number: 5,316,668
[45] Date of Patent: May 31, 1994

[54] WASTEWATER TREATMENT PLANT AND APPARATUS

[75] Inventor: Nianfa Tang, Richmond Hts., Ohio

[73] Assignee: JET, Inc., Cleveland, Ohio

[21] Appl. No.: 17,701

[22] Filed: Dec. 22, 1992

[51] Int. Cl.⁵ .............................................. C02F 3/12
[52] U.S. Cl. ................................. 210/151; 210/195.4; 210/202; 210/626
[58] Field of Search ............ 210/150, 151, 194, 195.3, 210/195.4, 220, 202, 615, 617, 626, 629

[56] References Cited

U.S. PATENT DOCUMENTS

| | | | |
|---|---|---|---|
| 3,195,727 | 7/1965 | Kibbee | 210/195.4 |
| 3,805,957 | 4/1974 | Oldham et al. | 210/195.4 |
| 3,907,672 | 9/1975 | Milne | 210/626 |
| 3,928,199 | 12/1975 | Kirk et al. | 210/150 |
| 3,966,599 | 6/1976 | Burkhead | 210/151 |
| 3,966,608 | 6/1976 | Mason et al. | 210/151 |
| 3,972,965 | 8/1976 | Higgins | 261/91 |
| 4,139,471 | 2/1979 | Toti | 210/195.4 |
| 4,263,143 | 4/1981 | Ebner et al. | 210/629 |
| 4,289,626 | 9/1981 | Knopp et al. | 210/616 |
| 4,415,451 | 11/1983 | Suzuki | 210/610 |
| 4,415,454 | 11/1983 | Fuchs | 210/616 |
| 4,505,813 | 3/1985 | Graves | 210/86 |
| 4,540,528 | 9/1985 | Haegeman | 261/91 |
| 4,608,157 | 8/1986 | Graves | 210/86 |
| 4,618,426 | 10/1986 | Mandt | 210/620 |
| 4,663,046 | 5/1987 | Feldkirchner et al. | 210/616 |
| 4,818,404 | 4/1989 | McDowell | 210/603 |
| 4,844,843 | 7/1989 | Rajendren | 261/30 |
| 4,859,325 | 8/1989 | Cormier | 210/195.3 |
| 4,956,082 | 9/1990 | Choi | 210/150 |
| 5,160,620 | 11/1992 | Lygren | 210/151 |

FOREIGN PATENT DOCUMENTS

| | | |
|---|---|---|
| 0134131 | 3/1985 | European Pat. Off. . |
| 142123A | 5/1985 | European Pat. Off. . |
| 201924A | 11/1986 | European Pat. Off. . |
| 301237A | 2/1989 | European Pat. Off. . |
| 478408A | 4/1992 | European Pat. Off. . |
| 3619247 | 12/1987 | Fed. Rep. of Germany . |
| 3715023 | 11/1988 | Fed. Rep. of Germany . |
| 3718191 | 12/1988 | Fed. Rep. of Germany . |
| 3900153 | 7/1989 | Fed. Rep. of Germany . |
| 3813386 | 11/1989 | Fed. Rep. of Germany . |
| 2475521 | 8/1981 | France . |
| 2507500 | 12/1982 | France . |
| 2547574 | 12/1984 | France . |
| 2551049 | 3/1985 | France . |
| 2565579 | 12/1985 | France . |
| 2604168 | 3/1988 | France . |
| 2612913 | 9/1988 | France . |
| 57-122997 | 7/1982 | Japan . |
| 58-104694 | 6/1983 | Japan . |
| 60-244394 | 12/1985 | Japan . |
| 3202195 | 9/1991 | Japan . |
| 3267198 | 11/1991 | Japan . |
| 9111396 | 8/1991 | PCT Int'l Appl. . |
| 9201636 | 2/1992 | PCT Int'l Appl. . |
| 1439745 | 5/1973 | United Kingdom . |
| 1498360 | 5/1976 | United Kingdom . |
| 1315129 | 11/1979 | United Kingdom . |
| 2151497 | 7/1985 | United Kingdom . |

OTHER PUBLICATIONS

Rittmann, *Aerobic Biological Treatment*, 1987.

(List continued on next page.)

*Primary Examiner*—Christopher Upton
*Attorney, Agent, or Firm*—Jon L. Roberts; Thomas M. Champagne

[57] ABSTRACT

A wastewater treatment plant comprising a pretreatment chamber, aeration chamber and a settling chamber designed to minimize or eliminate sludge buildup at the bottom of the aeration chamber. Two support walls are provided. The combined function of one support wall and an angular portion at the bottom of the common wall between the aeration and settling chamber is to regulate the flow pattern in the aeration chamber and return settled biodegradable matter from the bottom of the settling chamber to the aeration chamber for further treatment. The fluid flow created by the wall structure enhances the action of the settling chamber and elinates dead zones in the aeration chamber thus minimizing sludge buildup.

15 Claims, 4 Drawing Sheets

OTHER PUBLICATIONS

Tanaka, Oshima, and Rittmann, *Performance Evaluation of Rotating Biological Contactor Processes*, 1987.

NSF International, *Wastewater Technology*, Report on Evaluation of Scienco/FAST Model 23-001-750, Aug. 1992.

Scienco/FAST, *Single Home FAST*, Brochure and Engineering Data, Feb. 1992.

Banerji and CHO, *Evaluation of a Small-Scale Biofilm Process for Wastewater Treatment*, 1991.

Wang et al., *A Study of Simultaneous Organics and Nitrogen Removal By Extended Aeration Submerged Biofilm Process*, 1991.

Scienco, *Industrial Product Data*, Jul., 1986 and Various Scienco/FAST Brochures.

Iwai et al., *Design and Operation of Small Wastewater Treatment Plants by the Microbial Film Process*, 1990.

Paolini, A. E., *Effect of Biomass on Oxygen Transfer in RBC Systems*, Spr. 1986.

Paolini and Variali, *Kinetic Considerations on the Performance of Activated Sludge Reactors and Rotating Biological Contactors*, Feb. 1982.

Ouyang et al., *Effects of Various Biofilm Processes for Treating High-Aged Landfill Leachate*, Jun. 1991.

Hiavach et al., *Submerged Biological Contactor Full-Scale Demonstration Studies of Operational Characteristics*, Nov. 1990.

Chou et al., *Field Performance of Three RBC Aeration Modes Treating Industrial Wastes*, May 1990.

Backhurst et al., *Rates of Oxygen Transfer Using a Model Surface Aerator*, 1987.

WASTEWATER TREATMENT PLANT AND APPARATUS

FIELD OF THE INVENTION

The present invention relates generally to wastewater treatment plant design. The invention more specifically creates proper hydraulic conditions for the treatment of wastewater by mixed liquor mixing, circulation and effluent collection in the treatment plant while minimizing sludge buildup in treatment tanks.

BACKGROUND OF THE INVENTION

Since the 1970's, different types of tanks have been developed for wastewater treatment. In such tanks, aeration of wastewater is a key step in the treatment and results in a circulation of partially treated wastewater with incoming untreated wastewater. Blowers, air compressors, surface aerators and venturi aerators are used in the different wastewater treatment systems, all of which interact with the design of the tank in which they exist. Part of the function of these aerators is to create a circulation flow in the treatment tank to keep organic waste digestion processes going in an effective manner.

The aeration step of wastewater treatment requires a chamber in which aerobic digestion of organic solids can occur. Typically an actuated sludge process, or biofilm process occurs in the presence of such aeration. Most aeration chambers are in a cubic shape. In these chambers, there are some "dead corners" where low flow velocity in these corners causes organic solids to accumulate. The treatment efficiency of the overall process is affected by these "dead corners" where organic solids are not effectively digested. This in turn results in the build up of sludge in the bottom of the tank which must later be removed.

Wastewater treatment plants in different forms have been the subject of invention along with the processes used in the plants. Wastewater treatment plants are designed to digest organic material that is present in wastewater. As previously stated, a by-product of that digestion process is the formation of sludge which collects at the bottom of the waste treatment tanks. That sludge must later be removed and disposed of through a variety of means including incineration, landfill deposit, and other expensive and environmentally costly methods.

U.S. Pat. No. 4,505,831 to Graves discloses a wastewater plant having a particular tank design which is used in conjunction with an aerobic digestion process (see also U.S. Pat. No. 4,608,157 to Graves). This design comprises three chambers: a pretreatment chamber, an aeration chamber, and a final "clarification" or settling chamber. This design also comprises an opening at the bottom of a wall that separates the aeration chamber from the final clarification chamber to allow organic particles to settle out of solution in the final clarification chamber, falling to the bottom of the aeration chamber. However, when such particles reach the bottom of the aeration chamber they tend to remain there where they collect for subsequent removal due to lack of fluid circulation.

U.S. Pat. No. 3,966,608 to Mason et al. describes a liquid treatment apparatus for treatment of biodegradable material. This particular tank design also allows sludge or by-products from the aerobic process to sink to the bottom of the tank for subsequent collection. Again, a quiescent state exists at the bottom of the tank where sludge collects.

U.S. Pat. No. 3,972,965 to Higgins et al. describes a special aerator which is essentially the same as that disclosed in the U.S. Pat. No. 3,966,608 to Mason. As such the tank design embodied therein suffers from the same problem of dealing with sludge collecting at the bottom of a tank.

U.S. Pat. No. 3,966,599 to Burkhead et al. describes a method and apparatus for treating biodegradable waste products. Again, sludge collects at the bottom of this tank which is in a quiescent state and must subsequently be removed and disposed of.

In view of these prior inventions' creation of sludge, it therefore becomes important to create a wastewater treatment process in such a manner that the maximum digestion takes place thereby minimizing sludge production.

It is therefore an object of the present invention to provide fluid circulation in the aeration chamber of a wastewater treatment plant eliminating dead corners in order to achieve maximum digestion of organic solids.

It is a further objective of the present invention to enhance the settling action in the settling chamber thereby increasing the digestion of organic matter.

A further object of the present invention is to provide support for biofilm that is submerged in the wastewater being treated in the aeration chamber.

SUMMARY OF THE INVENTION

The plant design of the present invention comprises three chambers (pretreatment, aeration and settling) each of which is enclosed and has a floor and walls. The pretreatment chamber has both an inlet and outlet to allow for the flow of wastewater from the pretreatment chamber to the aeration chamber. In the aeration chamber the wastewater is aerated and allowed to flow to the settling chamber from the bottom of the aeration chamber. The settling chamber has an outlet through which treated wastewater flows for discharge or further processing. Common walls separate the pretreatment chamber from the aeration chamber and the aeration chamber from the settling chamber. Both the pretreatment chamber and the settling chamber provide a quiescent settling condition to allow any suspended solids to settle out of solution. A circulation of the wastewater is created in the aeration chamber to allow for the aerobic digestion of organic solids as part of the wastewater treatment process. Additionally, one embodiment of this plant is designed for a process called the "submerged biofilm process."

The present invention provides a quiescent settling condition in the pretreatment chamber by providing by an inlet baffle which may be in the form of a "tee" or a baffle box and an outlet baffle which also may be in the form of a tee or a baffle box. The quiescent settling condition in the settling chamber is provided by a wall comprising an angular bottom-most portion between the aeration chamber and settling chamber (the "aeration/settling chamber wall").

The circulation flow in the aeration chamber of the present invention is created by a rotating submerged aerator, and two support walls. Any suspended solids in the aeration chamber are mixed with the wastewater from the pretreatment chamber. One embodiment of the present invention comprises a submerged biofilm process where the biofilm support media is supported by the support walls although the plant design is appropriate for a traditional activated sludge process where no biofilm is present.

The "biofilm process" is a method of wastewater treatment where a support media made of plastic, metal, ceramic or other suitable material is submerged in wastewater to be treated. Bacteria that digest organic solids grow on the support media forming a layer of bacteria or "biofilm." This biofilm then digests other organic material that come in contact with it thus eliminating the organic suspended solids from solution. However, in order for the biofilm process to digest suspended solids, those suspended solids must circulate through the biofilm and not fall to the bottom of the aeration tank and accumulate as sludge.

In order to eliminate the effect of regions of the treatment tanks with little or no circulation or "dead zones", and prevent or minimize the accumulation of sludge, a new shape for the aeration chamber of the waste treatment plant has been developed. The floor of the aeration/settling chamber wall is modified into a slope or arc shape. The slope is anywhere between 10° and 60° from the verticle. The function of the slope is to create a fluid force whereby settling in the settling chamber occurs more effectively and where settled organic solids are drawn back into the aeration chamber for subsequent digestion. The sloped portion also creates fluid force at the bottom of the aeration tank thereby eliminating dead zones.

The waste treatment plant is also modified by providing two support walls in the aeration chamber which are used not only to support the biofilm support media where present, but also to regulate the circulation flow. The support wall nearest the settling chamber is the longer of the two support walls. Its location cooperates with the common wall between the aeration and settling chambers thereby creating a channel where wastewater flows downward toward an angled portion of the common wall between the aeration and settling chambers. The angled portion of the common wall points back toward the aeration chamber. This structure enhances the fluid force that draws settled organic solids from the settling chamber and enhances the mixing and elimination of dead zones in the aeration chamber.

The submerged aerator is installed in the mixing zone, and in the biofilm process embodiment is surrounded by the biofilm support media. The mixed liquor is introduced into and aerated by the submerged aerator. The circulation of mixed liquor is achieved by rotation of the submerged aerator tips, which inject air into the wastewater being treated. The resultant bubbles cause a rising force circulating the water. The wastewater then circulates through the biofilm support media (if present), two support walls and the channel formed between longer support wall and the aeration/settling chamber wall. The angular portion of the wall regulates the flow pattern at the bottom of the aeration chamber, and produces a force which draws settled solids from the bottom of the settling chamber back into the aeration chamber for subsequent digestion. The angular portion of the aeration/settling chamber also minimizes the turbulence at the bottom of the settling chamber creating a laminar flow in the settling chamber. This structure has the additional advantage of improving settling efficiency in the settling chamber.

The treated supernatant in the settling chamber is collected by a baffle box or tee which is located the upper part of the settling chamber. Surface scum, if there is any, is kept outside of the baffle.

An alternative embodiment provides for aeration from a compressed air source taken from the side of the tank. In this embodiment the biofilm support media is installed against a wall which is next to the settling chamber. Air diffusers are located at the other side of the aeration chamber. The channel between the support wall nearest the settling chamber and the aeration/settling chamber wall (which has the angular portion at the bottom) regulates the circulation flow in the chamber. Complete circulation in the aeration tank is again accomplished by the combined action of the support wall and the angular portion of the aeration/settling chamber wall.

An alternative embodiment comprises the same wall structure without the presence of biofilm. This permits the same fluid forces to exist in an activated sludge treatment process. Then the same advantages exist with respect to enhancing settling action in the settling chamber, creating a lanimar flow at the bottom of the aeration tank, eliminating dead corners and generally enhancing the organic particle digestion process.

DETAILED DESCRIPTION OF THE INVENTION

Figure 1:
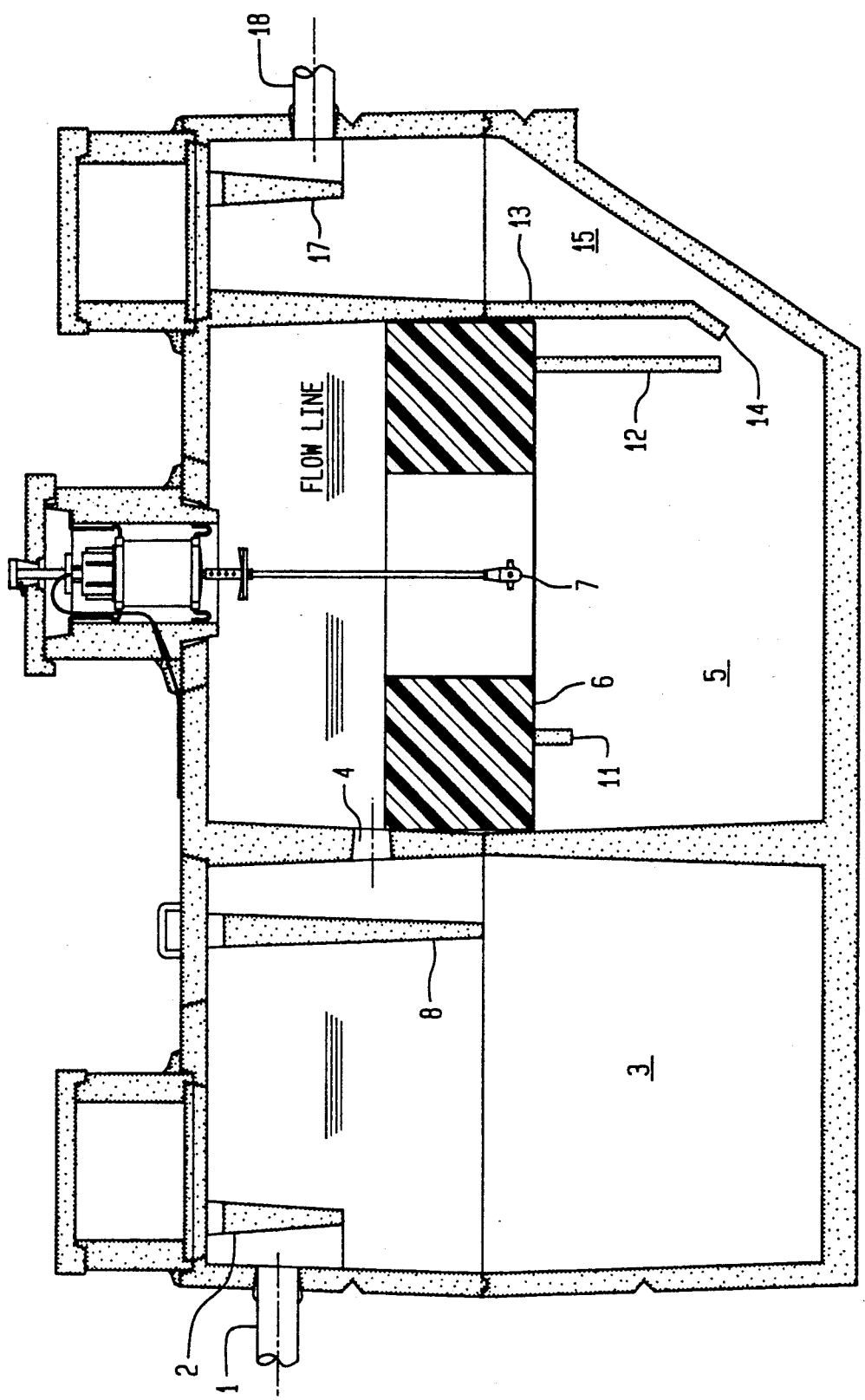
FIG. 1 is a side view of the biofilm-aeration plant comprising a pretreatment chamber, a biofilm-aeration chamber and a settling chamber.

Referring to FIG. 1, a side view of a waste treatment plant is shown. Influent enters the pretreatment chamber [3] through an influent line [1] and an inlet baffle [2]. Influent may be from a variety of sources such as sewage from an individual house or from a community residential area. Large organic and inorganic solids that settle out of the influent remain at the bottom of the primary pretreatment chamber [3] and are removed and disposed of by conventional means. The settled liquid then flows from the pretreatment chamber to the aeration chamber through a baffle box [8] and outlet port [4].

In the aeration chamber [5] a submerged rotary aerator injects air into the wastewater allowing digestion of suspended organic solids to occur. This is known as an "activated sludge" process. In this fashion untreated wastewater is mixed with treated waste water and organic particle digestion continues.

When a biofilm process is used the aeration chamber [5] further comprises plastic biofilm support media [6] (although other materials may be used) coated with a biofilm, and two support walls.

The liquid from the pretreatment chamber is immediately mixed with mixed liquor (that is, a mixture of treated and untreated wastewater) that may already be undergoing treatment in the chamber, utilizing the biofilm support media and support walls [11] and [12]. In the biofilm plant embodiment, the support walls [11] and [12] are used to support the biofilm support media and channel a portion of the circulation flow. In this way, the solid particles, either from influent or sloughed from the biofilm support media, are circulated in the chamber and aerated by the aerator tips [7], and treated by the biofilm on the surface of the biofilm support media [6].

The current which passes through the channel between the support wall [12] and the aeration/settling chamber wall [13] flows downward to the bottom of the biofilm-aeration chamber [5]. The angular portion [14] at the bottom of the aeration/settling chamber wall [13] forces the current to flow at a certain angle. Bottom flow is created by this current. Settled solids in the settling chamber [15] are returned to the biofilm-aeration chamber [5] by a fluid force Which draws from the settling chamber toward the aeration chamber. The angular portion [14] prevents turbulence at the bottom of the settling chamber by creating a laminar flow and simultaneously enhances solids removal efficiency in the settling chamber.

The supernatant in the settling chamber [15] is collected and flows out through an effluent collection assembly which is in the form of a tee or baffle [17] and an effluent pipe [18]. The supernatant is collected at a certain depth from the water surface. Floating solids washout is prevented by the baffle box or tee [17].

Figure 2:
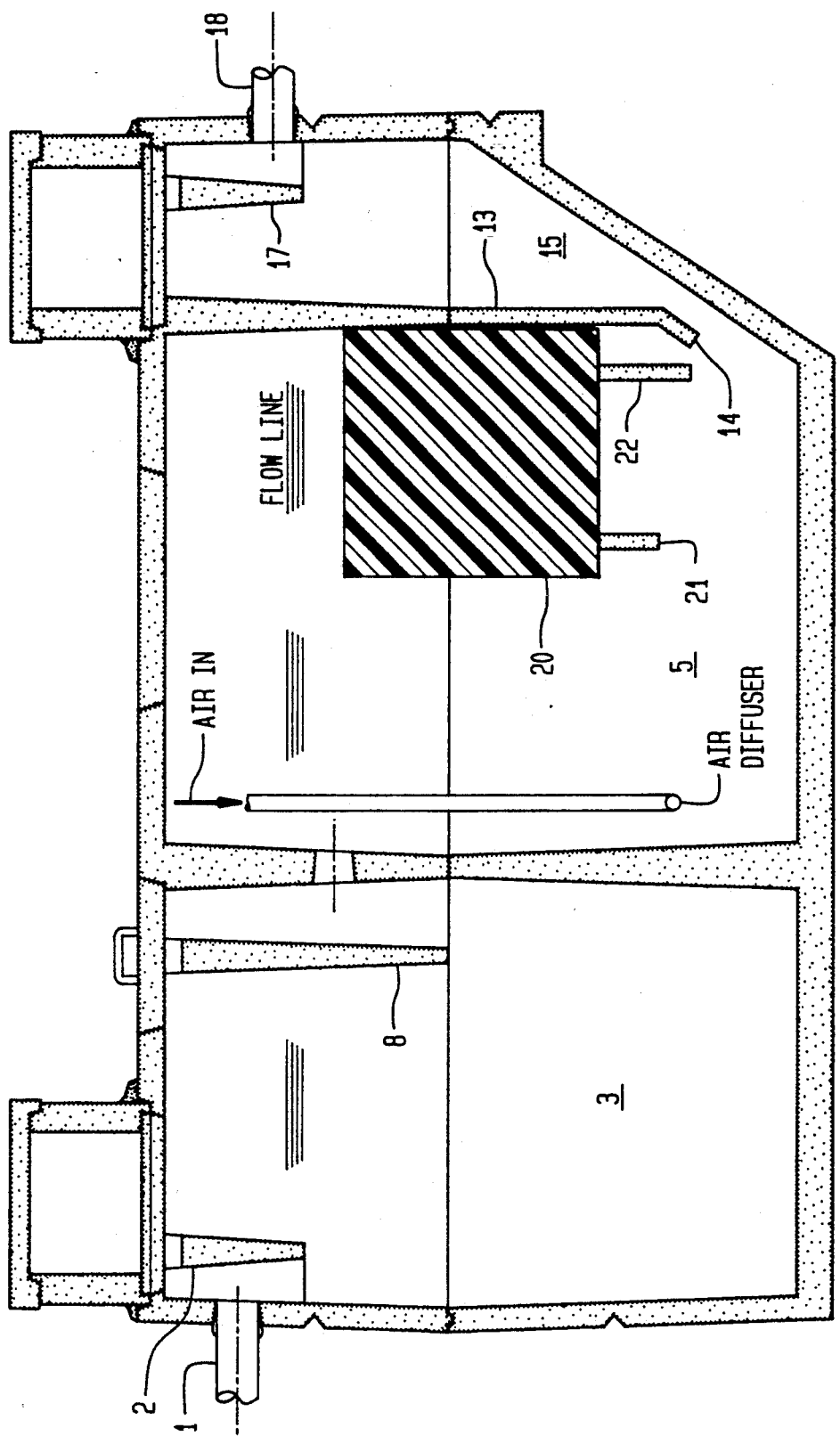
FIG. 2 is a side view of the modified submerged biofilm plant.

Referring to FIG. 2, a side view of the wastewater treatment plant for use with submerged biofilm is shown. The common wall between the aeration and settling chambers ending in an angular portion and two support walls 21 and 22 are installed in parallel in the same fashion as previously described in FIG. 1. The mixed liquor in the aeration chamber and the liquid from the pretreatment chamber are mixed and aerated in the mixing zone, then circulated in the chamber and flowed through the biofilm 20 where organic particle digestion occurs. A fluid force is again established by the angled portion of the aeration/settling chamber wall in conjunction with the support wall which draws returning organic particles from the quiescent settling condition in the settling chamber.

Figure 3:
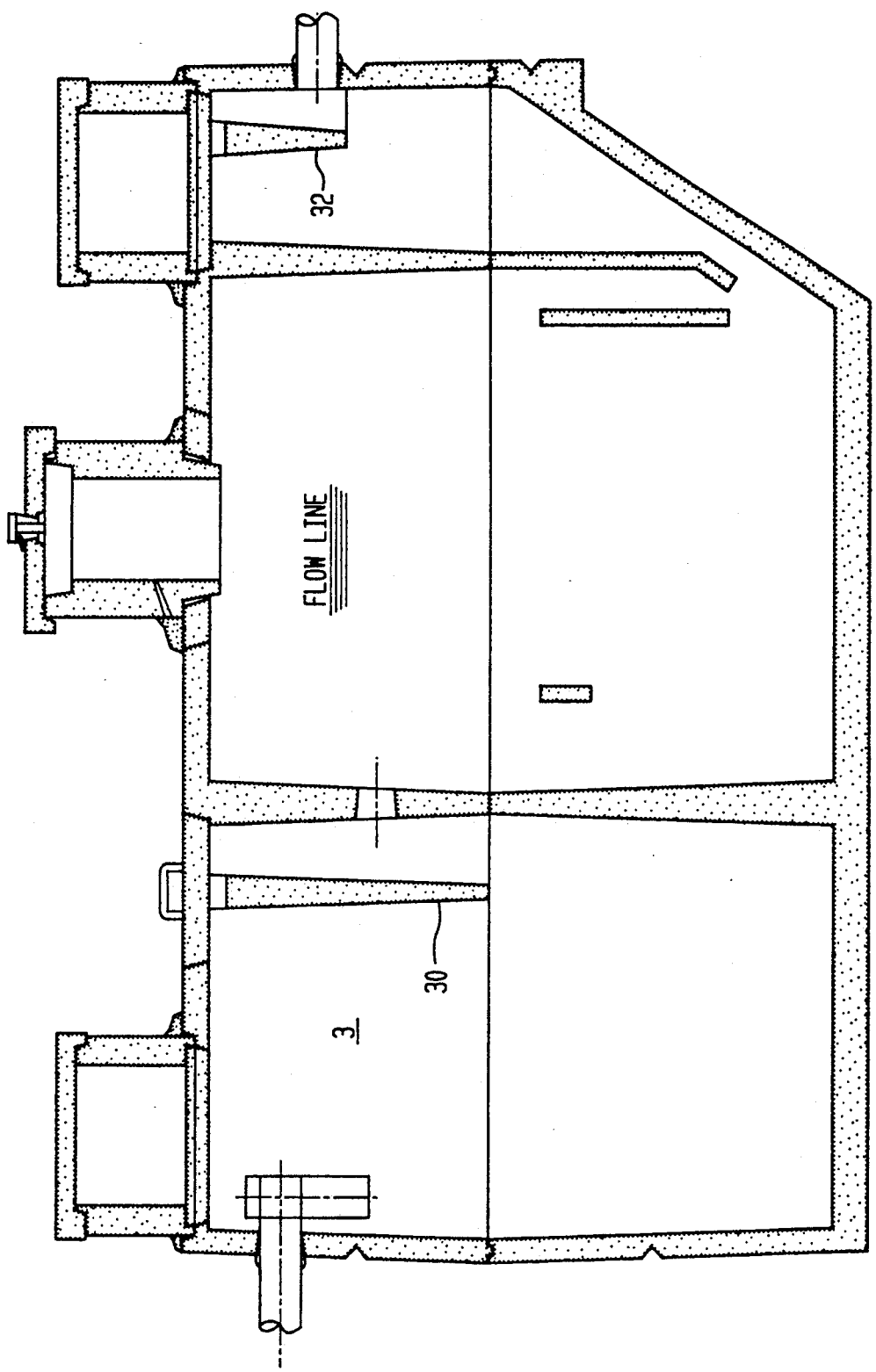
FIG. 3 is a side view of a modified activated sludge plant.

Referring to FIG. 3, when used with a conventional activated sludge process, baffle boxes 30 and 32 are present. These baffle boxes are open at their bottom most portion which are below the water line in the treatment plant.

Figure 4:
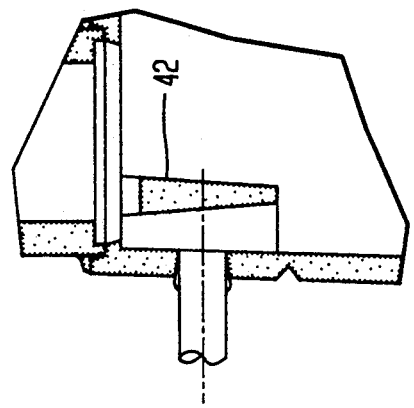
FIG. 4 is a side view of the inlet baffle box of the pretreatment chamber.

Referring to FIG. 4 an alternate baffle 42 for the inlet of the pretreatment chamber is shown. This baffle box is open at the bottom which is situated below the water line in the pretreatment chamber.

Figure 5:
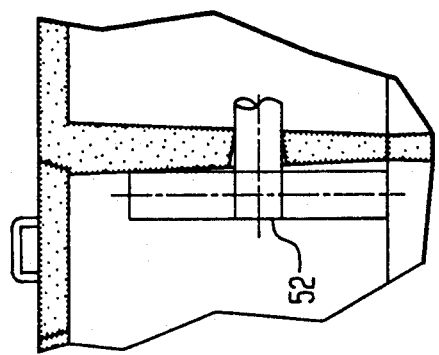
FIG. 5 is a side view of the outlet tee of the pretreatment chamber.

Referring to FIG. 5 an alternate baffle 52 for the outlet of the pretreatment chamber is shown. This baffle comprises a plastic "tee" whose bottom opening is situated below the water level of the pretreatment chamber. It should be noted that in bothe the baffle box and the "tee" embodiments, the bottom of the outlet baffle is below the water level of the pretreatment chamber and further is below the level of the bottom opening of the inlet baffle of the pretreatment chamber.

Figure 6:
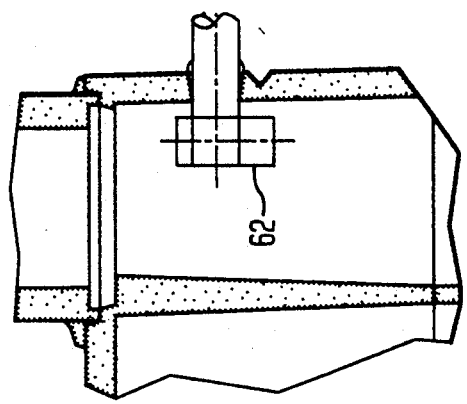
FIG. 6 is a side view of the outlet tee of the settling chamber.

Referring to FIG. 6 an alternate baffle 62 for the outlet of the settling chamber is shown. This baffle comprises a plastic "tee" whose bottom opening is below the water level of the settling chamber. It should be noted that all tee can be made from plastic, stainless steel or other suitable materials.

What is claimed is:

1. A wastewater treatment plant, comprising:
   A) a pretreatment chamber;
   B) an aeration chamber;
   C) a settling chamber;
   D) a first wall common to the pretreatment chamber and the aeration chamber and separating the pretreatment chamber from the aeration chamber;
   E) a second wall common to the aeration chamber and the settling chamber and separating the aeration chamber from the settling chamber;
   F) an inlet means for introducing wastewater into the pretreatment chamber from outside the wastewater treatment plant;
   G) an outlet means for conducting wastewater from the settling chamber to outside the wastewater treatment plant; and
   H) aeration means located in the aeration chamber for aerating wastewater in the aeration chamber;
   I) the first wall including first passage means for conducting wastewater flow from the pretreatment chamber into the aeration chamber;
   J) the second wall including second passage means for conducting wastewater flow from the aeration chamber into the settling chamber, the second passage means providing the only means for conducting wastewater flow between the aeration chamber and the settling chamber;
   K) the outlet means establishing a wastewater level within the pretreatment chamber, aeration chamber, and settling chamber;
   L) the inlet means, first passage means, second passage means, and outlet means defining a general wastewater flow direction within the wastewater treatment plant;
   M) The aeration chamber including a floor, a first substantially straight support wall, and a second substantially straight support wall, the first support wall and the second support wall being attached to the aeration chamber and oriented substantially perpendicular to the general wastewater flow direction and substantially parallel to the first wall and the second wall;
   N) the first support wall being shorter than the second support wall;
   O) the first support wall being located closer than the second support wall to the first wall and the second support wall being located closer than the first support wall to the second wall;
   P) the second wall having a top and a bottom, the bottom of the wall being located near to the floor of the aeration chamber and including an angled portion terminating the bottom of the second wall and pointing toward the aeration chamber; and
   Q) the angled portion of the second wall and the floor of the aeration chamber having a gap disposed therebetween, the gap defining the second passage means.

2. The wastewater treatment plant according to claim 1, further comprising a first baffle means connected to the inlet means of the pretreatment chamber for slowing the flow of wastewater into the pretreatment chamber, creating a quiescent condition in the pretreatment chamber, the first baffle means having a bottom opening.

3. The wastewater treatment plant according to claim 2 wherein the first baffle means is a "tee" structure, the bottom opening of which is situated below the wastewater level of the pretreatment chamber.

4. The wastewater treatment plant according to claim 2 wherein the first baffle means is a baffle box, the bottom opening of which is situated below the wastewater level of the pretreatment chamber.

5. The wastewater treatment plant according to claim 2 further comprising a second baffle means for preventing any floating matter from passing from the pretreatment chamber to the aeration chamber, the second baffle means being connected to the first passage means and comprising a bottom opening, the bottom opening being situated below the wastewater level of the pretreatment chamber and further being situated below the bottom opening of the first baffle means.

6. The wastewater treatment plant according to claim 5 wherein the second baffle means is a "tee".

7. The wastewater treatment plant according to claim 5 wherein the second baffle means is a baffle box.

8. The wastewater treatment plant according to claim 1, further comprising a third baffle means comprising a bottom opening situated below the wastewater level of the settling chamber and connected to the outlet means.

9. The wastewater treatment plant according to claim 8 wherein the third baffle means is a "tee".

10. The wastewater treatment plant according to claim 8 wherein the third baffle means is a baffle box.

11. The wastewater treatment plant according to claim 1, further comprising biofilm support media, supported by the first support wall and the second support wall, the biofilm support media being completely submerged in the wastewater of the aeration chamber.

12. The wastewater treatment plant according to claim 1 wherein the aeration means is a rotating aeration means located in the aeration chamber, about equidistant from the first wall and the second wall, and submerged in the wastewater of the aeration chamber.

13. The wastewater treatment plant according to claim 1 wherein the aeration means is a compressed air distribution means located in the aeration chamber opposite the first wall.

14. The wastewater treatment plant according to claim 1 wherein the angled portion of the second wall is pointed back on an angle that is between 10 degrees and 60 degrees from the vertical.

15. The wastewater treatment plant according to claim 1, further comprising a channel located between the second wall and the second support wall through which wastewater is circulated, the channel creating a fluid force in the direction of the aeration chamber.

* * * * *